US007139969B1

(12) United States Patent
Ruble et al.

(10) Patent No.: US 7,139,969 B1
(45) Date of Patent: Nov. 21, 2006

(54) METHOD AND SYSTEM FOR EVALUATING AND CONNECTING WEB PARTS

(75) Inventors: B. Scott Ruble, Bellevue, WA (US); Deepali Tamhane, Redmond, WA (US); Michelle Sarah Tarson, Kirkland, WA (US); Greg S. Lindhorst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 10/461,116

(22) Filed: Jun. 13, 2003

(51) Int. Cl.
*G06F 9/45* (2006.01)
(52) U.S. Cl. ............... 715/500.1; 717/109; 719/318
(58) Field of Classification Search ........... 719/318; 715/500.1; 717/109, 116
See application file for complete search history.

(56) References Cited

U.S. PATENT DOCUMENTS

| 5,953,526 | A  | * | 9/1999  | Day et al. ............... 717/108 |
| 6,083,277 | A  | * | 7/2000  | Fowlow et al. .......... 717/107 |
| 6,185,728 | B1 | * | 2/2001  | Hejlsberg ................ 717/109 |
| 6,337,696 | B1 | * | 1/2002  | Lindhorst et al. ........ 715/763 |
| 6,701,513 | B1 | * | 3/2004  | Bailey ..................... 719/318 |
| 6,810,522 | B1 | * | 10/2004 | Cook et al. .............. 719/316 |
| 6,951,022 | B1 | * | 9/2005  | Golde et al. ............. 719/318 |
| 2003/0056024 | A1 | * | 3/2003  | Tlaskal et al. ........... 709/315 |
| 2004/0056908 | A1 | * | 3/2004  | Bjornson et al. ........ 345/968 |
| 2004/0217985 | A9 | * | 11/2004 | Ries et al. ............... 345/740 |
| 2005/0273706 | A1 | * | 12/2005 | Manber et al. .......... 715/513 |

* cited by examiner

*Primary Examiner*—Doug Hutton
(74) *Attorney, Agent, or Firm*—Merchant & Gould P.C.

(57) ABSTRACT

The Web Part authoring framework provides the a graphical user interface for connecting Web Parts, mechanisms for determining the compatibility between Web Parts, and the means to persist the connection between Web Parts. The framework builds the user interface for selecting the source and target parts based on a series of compatibility rules. A user can access a menu to specify the type of connection between a compatible source and target part. If the Web Parts implement different connection interface types, a transformer is generated to make the Web Parts compatible. The target and source Web Parts can reside on the same or different pages. Additionally, the target and source Web Parts can be created by different developers. After the end user defines the connection, the framework forms the connection between the Web Parts so the parts can share information.

22 Claims, 14 Drawing Sheets

METHOD AND SYSTEM FOR EVALUATING AND CONNECTING WEB PARTS

FIELD OF THE INVENTION

The present invention relates to the field of content retrieval. In particular, the invention allows a user to connect multiple Web Parts retrieved from a distributed computer network and to share information between the connected Web Parts.

BACKGROUND OF THE INVENTION

Web Parts are an encapsulation of functionality and information that can be dropped onto a web page as a unit. By themselves, Web Parts are "islands" of functionality and information which have a fixed amount of value. The value each Web Part provides to a user viewing the Web Parts is limited to the distinct information the Web Part presents. However, much greater value can be achieved by connecting the Web Parts together to support communication or interaction between the connected Web Parts. For example, a web page could have two Web Parts, a list of team members and a list of activities for individuals on the team. The two Web Parts could be connected in a manner which allows the team members' Web Part to filter information from the activities' Web Part, whereby only the activities of team members are retrieved from the activities' Web Part.

Prior Web Part connection systems allowed Web Parts to share information between one another by hard wiring the connection between the two Web Parts. The Web Parts could share information if the two Web Parts had intimate knowledge of one another. This typically required that the same software developer develop the code for these Web Parts. These prior systems allowed for limited flexibility in sharing information between Web Parts. Furthermore, these prior systems did not allow end users to connect Web Parts to suit individual needs.

Yet another prior Web Part connection system developed a limited number of methods to allow Web Parts to connect to one another and to pass information. This prior system passed an object to a client. The object provided a series of utility-type methods for creating and converting uniform resource locator ("URL") code to allow Web Parts to be connected together. However, this system required the Web Parts to have intimate knowledge of one another before completion of tasks for connecting and passing information. While developers typically create Web Parts they often fail to adhere to a standard method that allows Web Parts to communicate with one another. This failure to adhere to a standard limits the ability to share information between Web Parts created by different developers.

In view of the foregoing, there is a need in the art for a method to allow end users to connect Web Parts via a graphical user interface instead of relying on code written specifically for each connection. This greatly increases the flexibility of Web Parts and puts control in the hands of the end user. In addition, there is a need in the art for a method to connect Web Parts that comply with a standard so that parts not developed by the same person can be connected.

SUMMARY OF THE INVENTION

For one aspect of the present invention, a user can connect two or more Web Parts by creating a connection by use of a Web Parts connection program. The Web Parts connection program typically provides the capability to design and create web sites. The Web Parts connection program typically allows users to create and modify web sites through the use of forms-based pages that can be accessed with a browser application, thereby providing less experienced computer users with the capability to design and modify pages of a web site. The connection allows the Web Parts to share information stored in each individual Web Part. The connection typically contains references to interfaces and interface properties for each connection. The connection can obtain these references from the Web Parts in support of the connection task.

Each Web Part can support one or more interfaces. An interface typically includes a grouping of events relevant to an item, such as a row in a list. The interface can permit a Web Part to receive or pass information to or from other Web Parts by forming a communication bus between the Web Parts. The interfaces on a Web Part can be implemented on the client-side, server-side, or both. The connected Web Parts can be on the same or different pages. The interfaces can be paired together to allow for a connection between Web Parts. Interfaces having opposite ends of the same interface type allow a connection to occur between the associated Web Parts. Web Parts having different interface types can be connected through the use of a transformer.

A transformer allows Web Parts with different interface types to connect and share information. The transformer can define how one item, such as a row, is converted to another item, such as a cell. The transformer typically resides in server-side code. If a transformer is needed on the client-side, the transformer can render the appropriate code to the client to complete the transformation.

The Web Part connection program typically determines if the Web Parts are compatible. Compatibility of the Web Parts can be determined by evaluating the compatibility of the interfaces supported by each Web Part, as discussed above. If the Web Parts have different interface types, a transformer may be attached to the dissimilar interfaces to make the Web Parts compatible.

A connection menu user interface for the Web Parts connection program typically provides a user with the ability to select information from each Web Part to be shared. The user can select information from one or multiple Web Parts to be shared with other Web Parts. The information is typically retrieved from one or more Web Parts and placed into another Web Part. A Web Part providing information can be defined as a source Web Part. The Web Part receiving the information can be defined as a target Web Part. The connection menu user interface is typically generated on the server-side.

For another aspect of the present invention, the user can connect Web Parts using a website management program. A user may want to include the use of a website management program with the Web Parts connection program to connect Web Parts located on different pages, cross-page connections. The Web Parts connection program can determine the compatibility of Web Parts located on one or more pages supported by the website management program. The Web Part connection program can verify the compatibility of the Web Parts by evaluating the interfaces supported by each Web Part. If the Web Parts are compatible, compatibility code can be generated by the Web Parts connection program and sent to the website management program. The compatibility code typically allows for a connection to be generated between a source Web Part and a target Web Part supported by the website management program. For example, the compatibility code can include the name of the target Web Part, the name of the source Web Part, the interface of the target Web Part, the interface of the source Web Part, the URL of the target Web Part, and the URL of the source Web Part. The compatibility code is used by the Web Parts to form a connection that allows the passage of data between the Web Parts.

BRIEF DESCRIPTION OF DRAWINGS

For a more complete understanding of exemplary embodiments of the present invention and the advantages thereof, reference is now made to the following description in conjunction with the accompanying drawings in which.

DETAILED DESCRIPTION OF THE EXEMPLARY EMBODIMENTS

Figure 1:
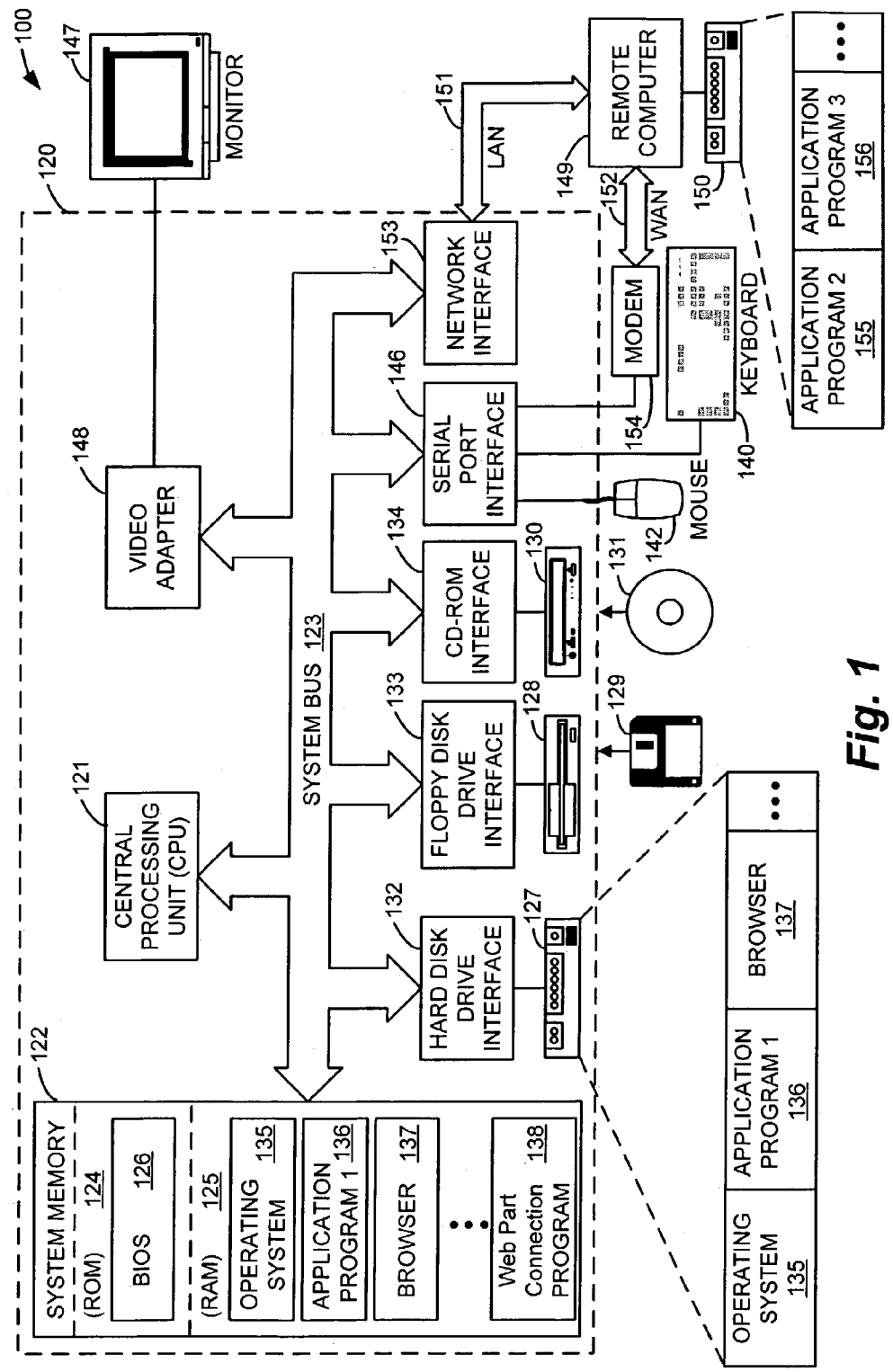
FIG. 1 is a block diagram illustrating an exemplary operating environment for implementation of various embodiments of the present invention.

The present invention supports a computer-implemented method and system for evaluating multiple Web Parts, determining the compatibility of the Web Parts, and generating a connection between compatible Web Parts. Exemplary embodiments of the invention can be more readily understood by reference to the accompanying figures.

Although exemplary embodiments of the present invention will be generally described in the context of a software module and an operating system running on a personal computer, those skilled in the art will recognize that the present invention can also be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules typically occurs in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices, and input devices. These processes and operations may utilize conventional computer components in a distributed computing environment.

The processes and operations performed by the computer include the manipulation of signals by a processing unit or remote computer and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Exemplary embodiments of the present invention include a computer program which embodies the functions described herein and illustrated in the appended flowcharts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flowcharts and associated description in the application text, for example. Therefore, disclosure of a particular set of program code instructions is not considered necessary for an adequate understanding of how to make and use the present invention. The inventive functionality of the claimed computer program will be explained in more detail in the following description is disclosed in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 is a block diagram illustrating an exemplary operating environment 100 for implementation of various embodiments of the present invention. Those skilled in the art will appreciate that FIG. 1 and the associated discussion are intended to provide a brief, general description of one exemplary embodiment of computer hardware and program modules, and that additional information is readily available in appropriate programming manuals, user's guides, and similar publications.

The exemplary operating environment 100 illustrated in FIG. 1 includes a general-purpose computing device that can be in the form of a conventional personal computer 120. As shown in FIG. 1, the personal computer 120 operates in a networked environment with logical connections to a remote server 149. The logical connections between the personal computer 120 and the remote server 149 are represented by a local area network 151 and a wide area network 152. Those of ordinary skill in the art will recognize that in this client/server configuration, the remote server 149 may function as a file server or computer server.

The personal computer 120 includes a processing unit 121, such as a "PENTIUM" microprocessor manufactured by Intel Corporation of Santa Clara, Calif. The personal computer also includes system memory 122, including read only memory (ROM) 124 and random access memory (RAM) 125, which is connected to the processor 121 by a system bus 123. An exemplary embodiment of the computer 120 utilizes a basic input/output system (BIOS) 126, which is stored in the ROM 124. Those skilled in the art will recognize that the BIOS 126 is a set of basic routines that helps to transfer information between elements of the personal computer 120. Those skilled in the art will also appreciate that the present invention may be implemented on computers having other architectures, such as computers that do not use a BIOS 126, and those that utilize other types of microprocessors for a processing unit 121.

Within the personal computer 120, a local hard disk drive 127 is connected to the system bus 123 via a hard disk drive interface 132. A floppy disk drive 128, which is used to read or write to a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134.

A user can enter commands and information into the personal computer 120 by using input devices, such as a keyboard 140 and/or pointing device, such as a mouse 142, which are connected to the system bus 123 via a serial port interface 146. Other types of pointing devices (not shown in FIG. 1) include track pads, track balls, digitizer pens, head trackers, data gloves, and other devices suitable for positioning a cursor on a monitor 105. The monitor 105 or other kind of display device is connected to the system bus 123 via a video adapter 148.

As depicted in FIG. 1, a number of program modules can be stored on ROM 124, RAM 125, hard disk 127, floppy disk 129, or CD-ROM/DVD disk 131, such as an operating system 135, an application program module 136, a browser 137, and a Web Part connection program module 138. Program modules typically include routines, sub-routines, programs, objects, components, data structures, etc., which perform particular tasks or implement particular abstract data types.

The remote server 149 in this networked environment is connected to a remote memory storage device 150. This remote memory storage device 150 is typically a large capacity device such as a hard disk drive, CD-ROM or DVD drive, magneto-optical drive or the like. Those skilled in the art will understand that program modules, such as the application program module 136, are provided to the remote server 149 via computer-readable media. The personal computer 120 is connected to the remote server 149 by a network interface 153, which is used to communicate over a local area network (LAN) 151.

In some embodiments, the personal computer 120 is also connected to the remote server 149 by a modem 154, which is used to communicate over a wide area network (WAN) 152, such as the Internet. The modem 154 is connected to the system bus 123 via the serial port interface 146. The modem 154 also can be connected to the public switched telephone network (PSTN) or community antenna television (CATV) network. Although illustrated in FIG. 1 as external to the personal computer 120, those of ordinary skill in the art can recognize that the modem 154 may also be internal to the personal computer 120, thus communicating directly via the system bus 123. It is important to note that connection to the remote server 149 via both the LAN 151 and the WAN 152 is not required, but merely illustrates alternative methods of providing a communication path between the personal computer 120 and the remote server 149.

Those skilled in the art will appreciate that program modules, such as the operating system 135, application program module 136, the browser 137, and the Web Part connection program module 138 can be provided to the personal computer 120 via computer-readable media. In exemplary embodiments of the operating environment 100, the computer-readable media can include the local or remote memory storage devices, which may include the local hard disk drive 127, floppy disk 129, CD-ROM/DVD 131, RAM 125, ROM 124, and the remote memory storage device 150. In some exemplary embodiments of the personal computer 120, the local hard disk drive 127 is used to store data and programs.

Although other elements of the personal computer 120 and the operating environment 100 in general are not shown, those of ordinary skill in the art will appreciate that such components and the interconnection between them are known. Accordingly, additional details concerning the elements of the personal computer 120 and the operating environment 100 in general need not be disclosed in connection with the present invention for it to be implemented by those of ordinary skill in the art.

Figure 2:
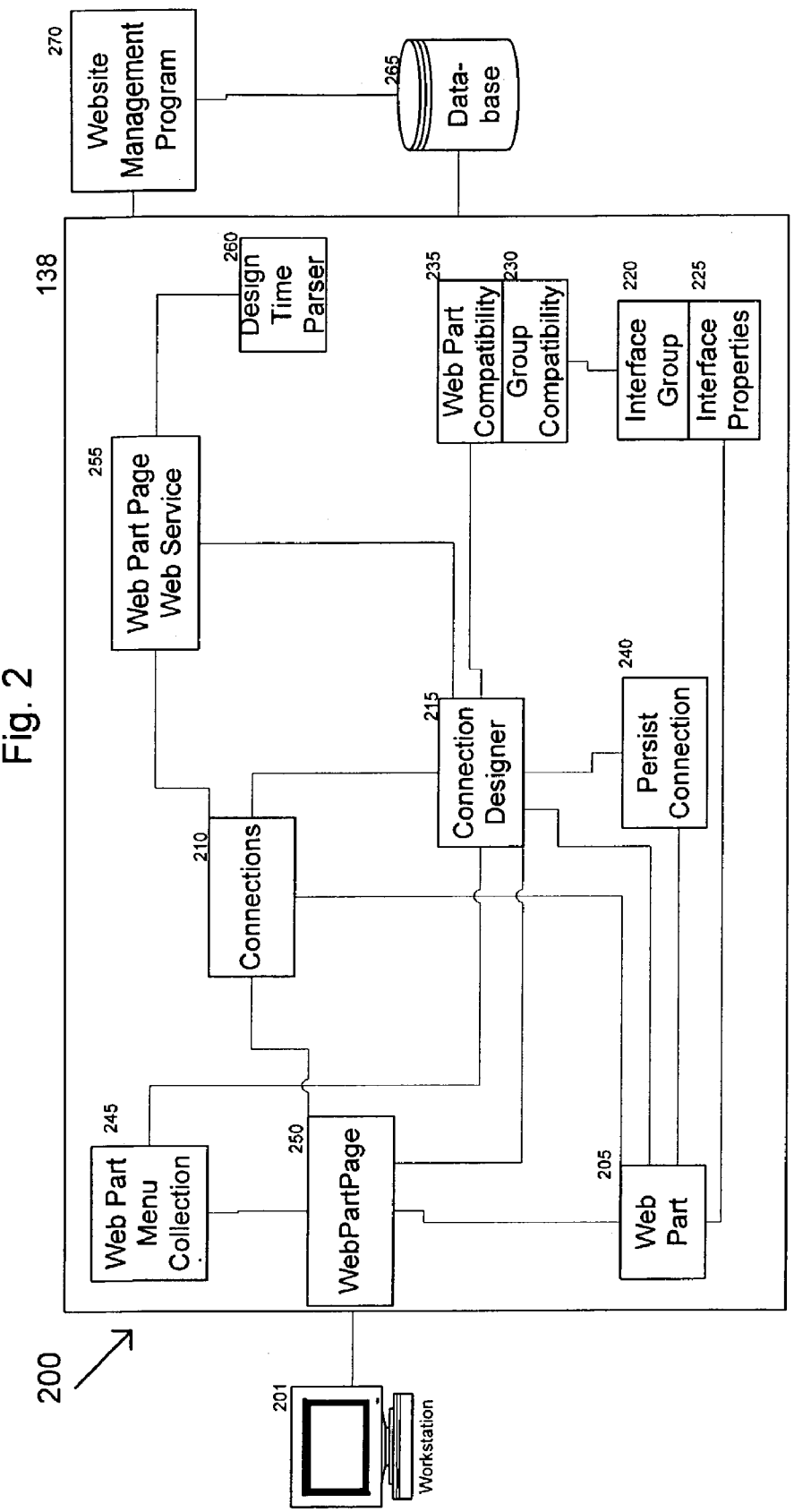
FIG. 2 is a block diagram of a Web Part connection system constructed in accordance with an exemplary embodiment of the present invention.

FIG. 2 is a block diagram illustrating a Web Part connection system 200, constructed in accordance with an exemplary embodiment of the present invention. Now referring to FIGS. 1 and 2, the exemplary Web Part connection system 200 comprises a workstation 201 running a Web Parts connection program 138, a database 265, and a website management program 270. The Web Parts connection program 138, database 265, and website management program 270 can reside either at a local computing environment, such as the workstation 201, or at a remote location, such as the remote server 110. The workstation 201 is communicably attached via a distributed computer network to the Web Parts connection program 138, database 265, and website management program 270. In one exemplary embodiment, the workstation 201 is a personal computer and the Web Parts connection program 138 resides in memory of the personal computer.

The database 265 is communicably attached via a distributed computer network to the Web Part connections program 138, the website management program 270, and the workstation 201. The database 265 comprises one or more information storage mediums from which information is retrieved and inserted into the Web Part connections program 138. The database 265 can contain connections persisted for use on later sessions of the Web Part connections program 138. In one exemplary embodiment, connection parameters persisted in the database for use on later sessions include: the target Web Part name, the source Web Part name, the source Web Part interface, the target Web Part interface, the type of transformer (if needed to make the interfaces compatible), the URL of the page to which the Web Part is connected (for cross page connections), and the initialization arguments of the interface for the Web Part on the other page (when completing a cross page connection). In one exemplary embodiment, the database 265 is a SQL server database.

The website management program 270 is communicably attached via a distributed computer network to the Web Part connections program 138, the workstation 201, and the database 265. The website management program 270 allows a user to design, create, or modify a new or existing website. The website management program 270 also allows for the connection of Web Parts from one or more pages. When Web Parts are connected, information can be passed back and forth or shared between the connected Web Parts.

The exemplary Web Parts connection program 138 typically comprises a Web Part object 205, a connections object 210, a connection designer object 215, an interface group object 220, an interface properties object 225, a group compatibility object 230, a Web Part compatibility object 235, a persist connections object 240, a Web Parts ("WP") menu collection object 245, a WebPartPage object 250, a Web Part Page web service object 255, and a design time parser 260.

The Web Part object 205 is an ASP.Net custom web form control. The connections object 210 holds references to the interfaces and interface properties for each connection. The connections object 210 can connect a source and target Web Part by retrieving events from source Web Parts and attaching the events to event handlers in the target Web Part. The events typically signal the type of data located in the source Web Part, while the event handler signals the type of data which may be received by the target Web Part. The connections object 210 also evaluates connections for errors and notifies Web Parts when they are connected to support communications between the "connected" Web Parts. The connections object 210 can also generate a transformer to be placed between two Web Parts that have different interface types. An interface typically includes a grouping of events relevant to an item, such as a row in a list of a Web Part. The transformer can generate code for the connected interfaces of different types by defining how one item, such as a row, is converted to another, such as a cell.

The connection designer object 215 evaluates each Web Part to see if the Web Part contains an interface group. An interface group is a collection of interfaces in a Web Part that allow a connection to another Web Part in an established order of priority. For example, a first Web Part can have three interfaces: A, B, and C. When the Web Part is connected to another Web Part, interface A, B, or C could provide the communication link between the two Web Parts if the interfaces are compatible. If a user wants interface B to attempt the connection first, then interface A, and finally interface C, an interface group can be created for the three interfaces in the first Web Part.

If a Web Part contains an interface group, the connection designer object 215 generates a Web Part compatibility object 235. The interface group object 220 is a collection of interfaces for a Web Part. The interface properties group object 225 stores the interface properties for the interface defined by the Web Parts to be connected. Interface properties provide information related to the compatibility of the associated interface to other interfaces. In one exemplary embodiment, interface properties include: the name of the interface; the type of interface; the number of connections the interface can support; a description of the interface; and the object which generated the interface.

The group compatibility object 230 is generated by the Web Part compatibility object 235 for each interface group defined in a source Web Part. In a scenario where two Web Parts connect and pass information from one to another, one Web Part can be described as a source Web Part and the other a target Web Part. The source Web Part contains the data that is passed to the target Web Part, which receives and stores the data.

The Web Part compatibility object 235 evaluates all the Web Parts and the interface groups defined by the Web Parts to determine compatibility. The persist connection object 240 is generated by the connection designer object 215 if a hidden field on a page indicates that a user has tried to create, modify or delete a connection. The persist connection object 240 validates the values set in the hidden fields and constructs, modifies, or deletes a connection string from the connection of the Web Part. The connection string comprises parameters that define the connection between the Web Parts. If the connection string has been modified, the connection between the Web Parts can change.

The WP menu collection object 245 generates connection menus for the user interface of the WPC program 138. The WebPartPage object 250 checks the hidden fields on the page and matches the identifications with the existing Web Parts. The WebPartPage object 250 also generates the connection designer object 215 and inputs the Web Parts into the connection designer object 215. The Web Part Page web service object 255 is used by third party authoring environments, such as the website management program 270, to retrieve the compatibility code between interface groups defined by the Web Parts. The design time parser 260 parses the page sent by the third party authoring environment.

Figure 3:
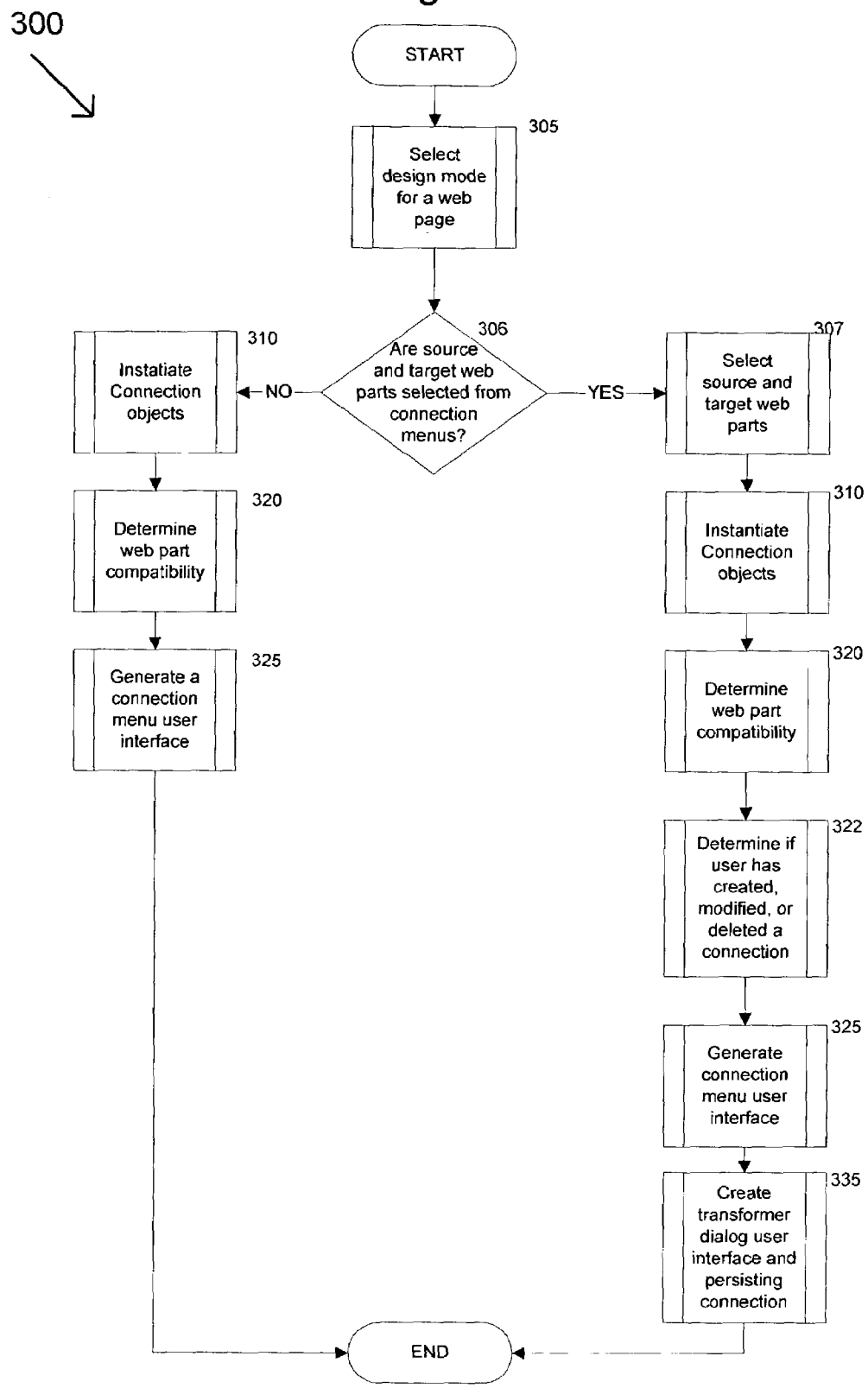
FIG. 3 is a flowchart illustrating a general overview for connecting Web Parts in accordance with an exemplary embodiment of the present invention.

FIGS. 3–14 are logical flowchart diagrams illustrating the computer-implemented processes completed by an exemplary method for forming connections between Web Parts in the Web Parts connection system 200. FIG. 3 is a logical flowchart diagram presented to illustrate the general steps of an exemplary process 300 for forming connections between Web Parts within the operating environment of the Web Parts connection system 200 of FIG. 2

Now referring to FIGS. 1, 2, and 3, the exemplary method 300 begins at the START step and proceeds to step 305, in which a user selects a design mode in the Web Part connections ("WPC") program 138. The user typically selects the design mode by using the mouse 142 to select a design mode feature presented by a user interface for the WPC program 138. The selection of a design mode alerts the WPC program 138 that the user want to create, modify, or delete connections between Web Parts.

In step 306, an inquiry is conducted to determine if the source and target Web Parts are selected from the connection menus. The connection menu provides the user with a list of possible source and target Web Parts on a page. The WP menu collection object 245 generates the connection menus. The source Web Part is the Web Part which contains data that is sent to target Web Parts. The target Web Part is the Web Part which receives data from the source Web Part. If the user selects the source and target Web Parts from the connection menus, the "YES" branch is followed to step 307, where the source and target Web Parts are selected from the connection menus.

In step 310, the connections object 210 is instantiated by the WPC program 138. When the connections object 210 is instantiated, a connection can be generated between the selected Web Parts. The connection does not allow data to pass between the Web Parts, but does allow for the interfaces in each Web Part to be passed to determine compatibility of the Web Parts. The connection designer object 215 determines if the selected source and target Web Parts are compatible in step 320. The WPC program 138 typically determines the compatibility of a source and target Web Part by evaluating the interfaces associated with each Web Part. If the source Web Part interface generates a communication bus with the target Web Part interface such that data can be passed from the source Web Part to the target Web Part, then the Web Parts are compatible.

In step 322, the connection designer object 215 determines if the user has created, modified, or deleted a connection. The WP menu collection 245 generates a connection menu user interface in step 325. The connection menu user interface provides a medium for the user to select the collection of data to be passed from the source Web Part to the target Web Part. For example, if a source Web Part contained a list of team members and a list containing addresses for each team member, the connection menu could provide a user-selectable medium containing both lists. The user could then select the list of team members, the list of addresses, or both, to be passed to the target Web Part.

In step 335, the transformer dialog user interface and the persist connection 240 are created by the WPC program 138. The transformer dialog user interface allows the user to select the field mapping between the source and target parts. For example, if the source Web Part data is a row of data and the target Web Part is a cell, the Web Parts would not be compatible. However, with the transformer, a user can designate which row column maps to the cell. This mapping is persisted and tells the WPC program 138 how to conform the row of data in the source Web Part to be displayed in the cell of the target Web Part. The process 300 continues to the END step.

Returning to step 306, if the source and target Web Parts are not selected from the connection menus, the "NO" branch is followed to step 310. In step 310, the connections object 210 is instantiated by the WPC program 138. The connection designer object 215 determines if the selected source and target Web Parts are compatible in step 320. The WP menu collection 245 generates a connection menu user interface in step 325. The process 300 continues to the END step.

Figure 4:
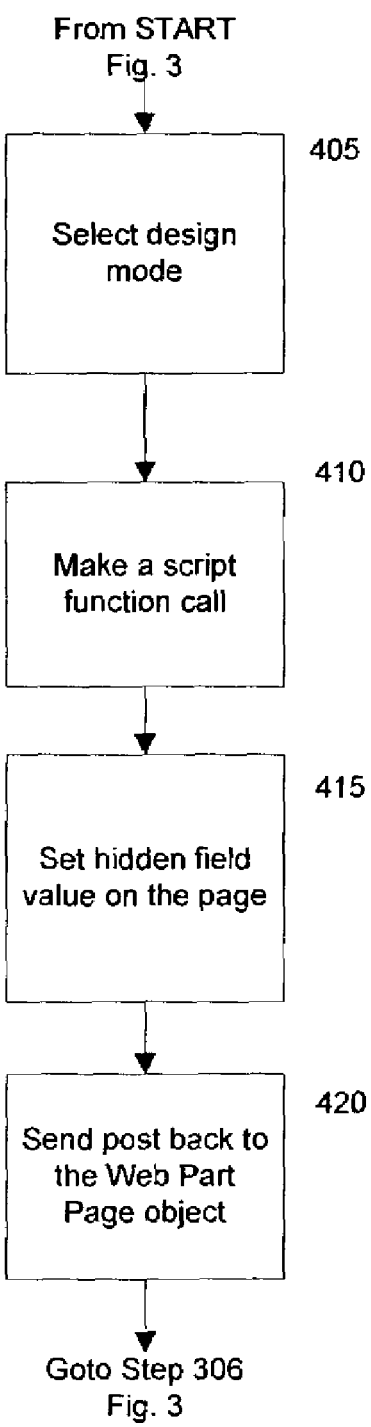
FIG. 4 is a flowchart illustrating a process for selecting a design mode to connect Web Parts in accordance with an exemplary embodiment of the present invention.

FIG. 4 is a logical flowchart diagram illustrating an exemplary computer-implemented method for selecting a design mode to connect Web Parts in the WPC program 138 as completed by step 305 of FIG. 3. Referencing FIGS. 1, 2, and 4, the exemplary method 305 begins with the user selecting the design mode from a drop down menu of the WPC program 138 in step 405. The selection of a design mode alerts the WPC program 138 that the user wants to create, modify, or delete connections between Web Parts. In step 410, the WPC program 138 makes a script function call to place a hidden field value on the page. In step 415, a hidden field value is placed on the page in response to the script function call. The hidden field value tells the WebPartPage object 250 that the page is in design mode. A post back is sent to the Web Part object 205. The process 305 continues to step 310 of FIG. 3.

Figure 5:
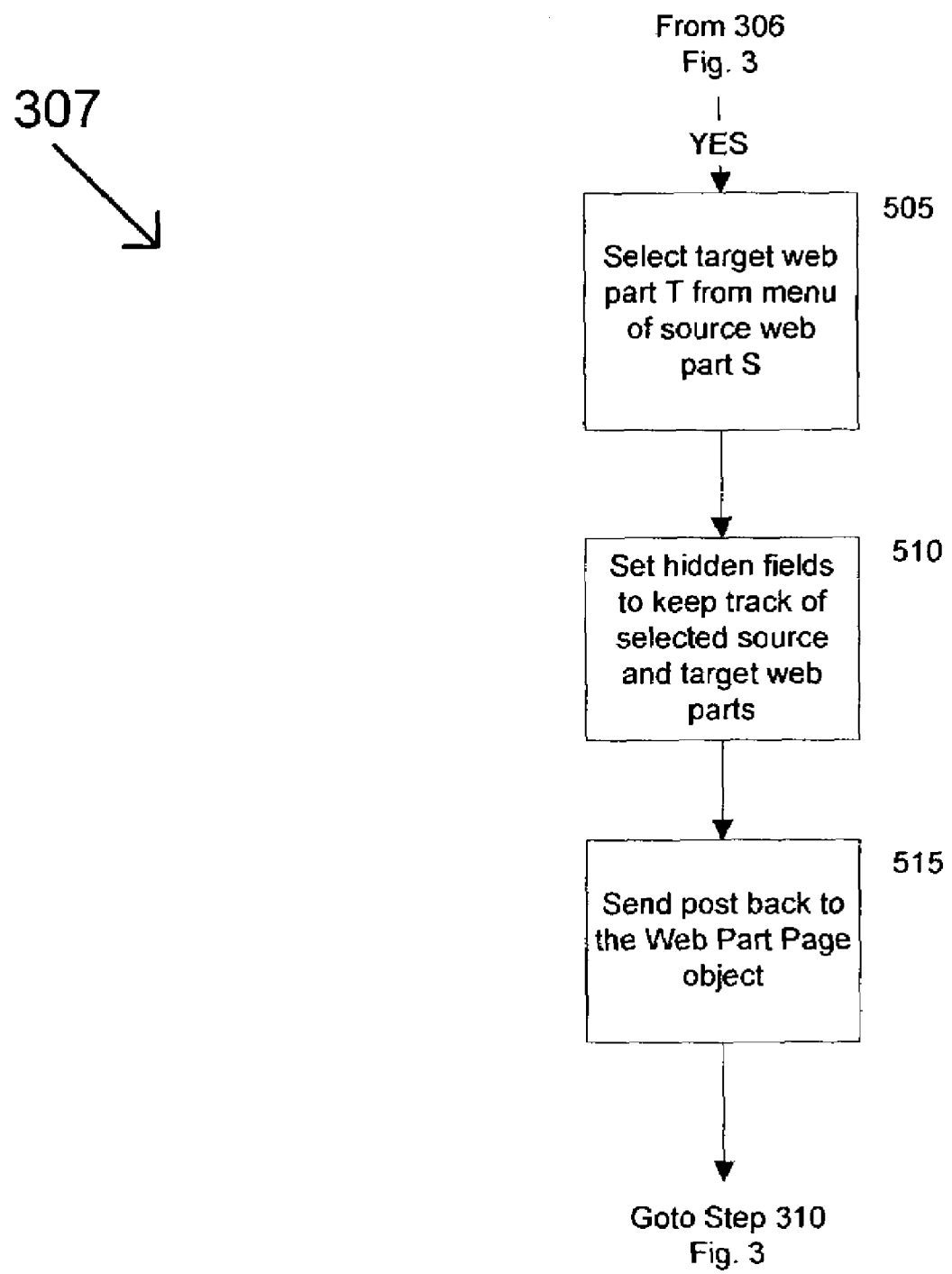
FIG. 5 is a flowchart illustrating a process for selecting source and target Web Parts in accordance with an exemplary embodiment of the present invention.

FIG. 5 is a logical flowchart diagram illustrating an exemplary computer-implemented method for selecting source and target Web Parts as completed by step 307 of FIG. 3. Now referring to FIGS. 1, 2, and 3, the exemplary method 307 begins with the user selecting target Web Part T from a menu of the source Web Part S generated by the WP menu collection object 245 in step 505. The Web Part object 205 sets the hidden fields to keep track of the selected source and target Web Parts in step 510. In step 515, a post back is sent to the Web Part object 205. The process 307 continues to step 310 of FIG. 3.

Figure 6:
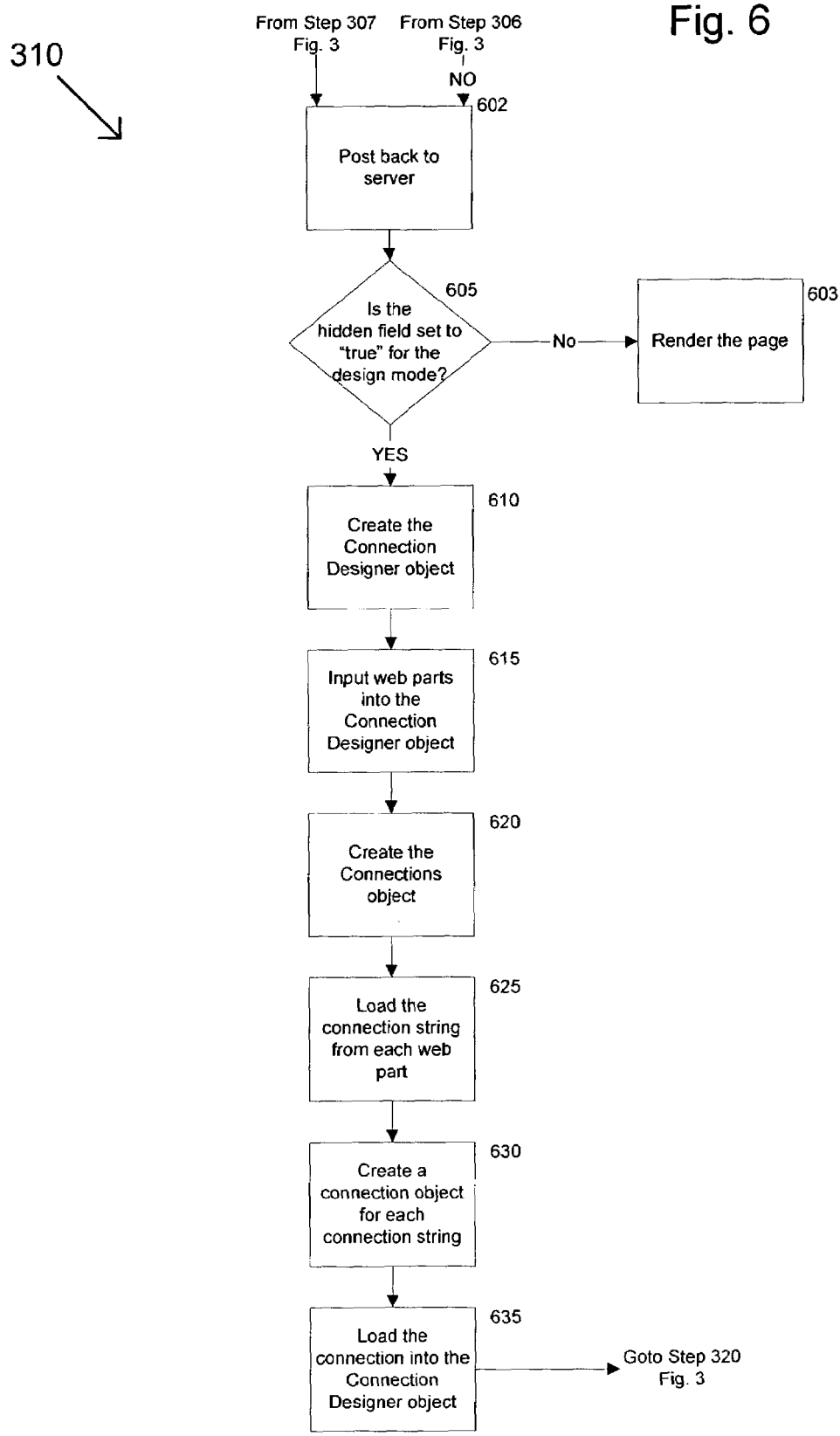
FIG. 6 is a flowchart illustrating a process for instantiating connection objects in accordance with an exemplary embodiment of the present invention.

FIG. 6 is a logical flowchart diagram illustrating an exemplary computer-implemented method for instantiating a connection between Web Parts as completed by step 310 of FIG. 3. Now referring to FIGS. 1, 2, and 6, the exemplary method 310 begins with a post back to the Web Part object 205 in step 602. In step 605, an inquiry is conducted to determine if the hidden field is set to "true" for the design mode. The WebPartPage object 250 determines if the hidden field is set to "true." In one exemplary embodiment, the hidden field being set to "true" signifies that the page is in design mode and that a user wishes to create, modify or delete a connection between Web Parts. If the hidden field is not set to "true," the "NO" branch is followed to step 603, where the WPC program 138 renders the page. If the hidden field is set to "true," the "YES" branch is followed to step 610, where the WebPartPage object 250 creates the connection designer object 215.

In step 615, the WebPartPage object 250 inputs Web Parts into the connection designer object 215. The WPC program 138 creates a connections object 210 in step 620. In step 625, the connections object 210 loads a connection string from each Web Part. The connection string comprises parameters that define the connection between the Web Parts. In one exemplary embodiment, the connection string parameters include: the source Web Part name, the target Web Part name, the source Web Part interface, the target Web Part interface, source Web Part events, source Web Part event handlers, target Web Part events, target Web Part event handlers, and whether the source Web Part or target Web Part have exceeded the maximum number of connections. The connections object 210 creates a connection for each connection string by reading in the connection string for each Web Part in step 630. In one exemplary embodiment, the connection between the source and target Web Parts is generated by connecting events in the source Web Part to event handlers in the target Web Part. When Web Parts are connected, information can be passed or shared between the connected Web Parts. In step 635, the connections object 210 loads the connections into the connection designer object 215. The process 310 continues to step 320 of FIG. 3.

Figure 7:
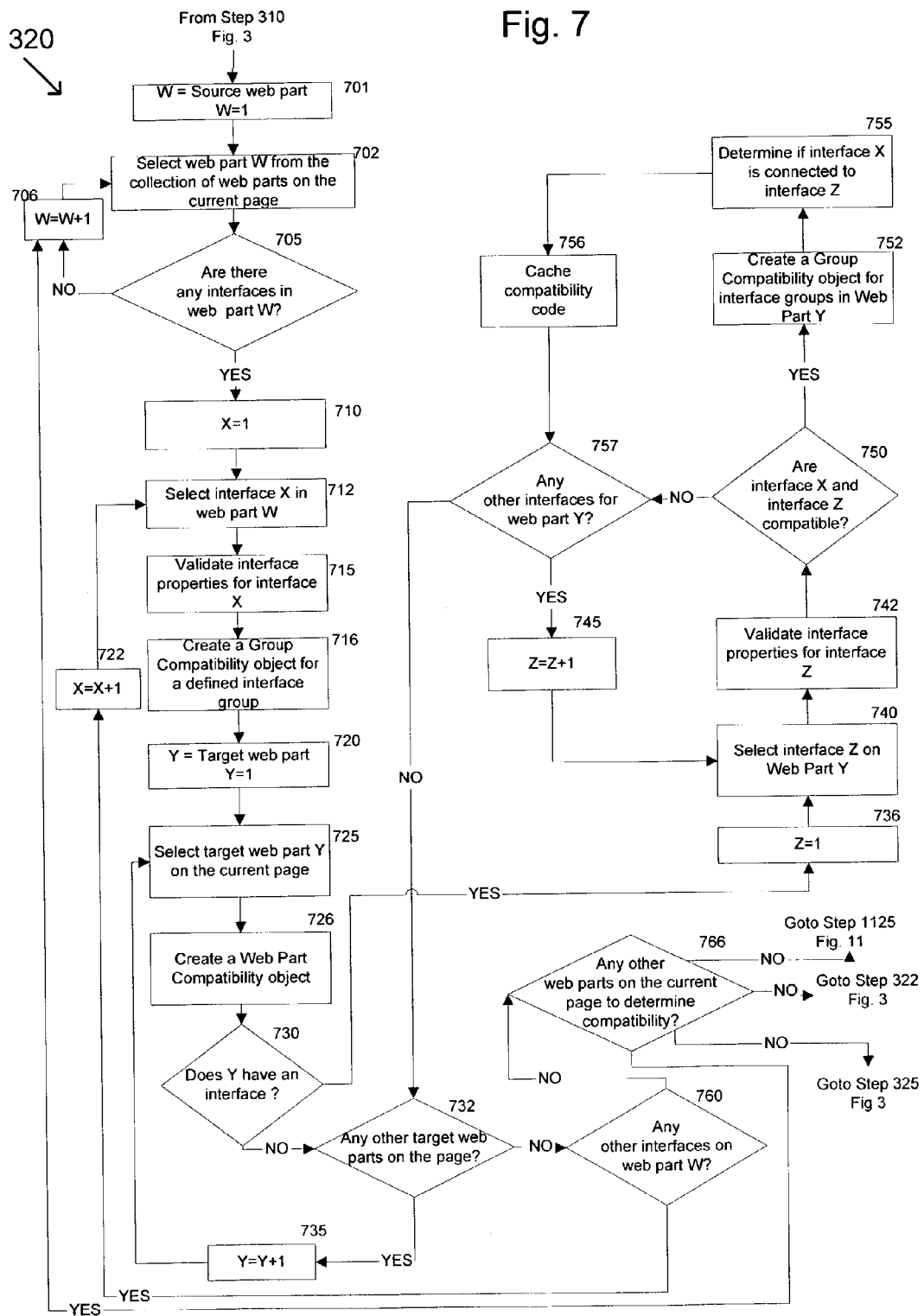
FIG. 7 is a flowchart illustrating a process for determining the compatibility of Web Part interfaces in accordance with an exemplary embodiment of the present invention.

FIG. 7 is a logical flowchart diagram illustrating an exemplary computer-implemented method for determining the compatibility of Web Part interfaces as completed by step 320 of FIG. 3. Referencing FIGS. 1, 2, and 7, the exemplary method 320 begins with a counter variable, W, being set equal to one in step 701. Variable, W, represents the source Web Part in a Web Part collection. A Web Part collection is a group of Web Parts on a Web Part page. A source Web Part can send the data contained within it to more than one target Web Part. Similarly, a target Web Part can receive data from multiple source Web Parts. In step 702, Web Part W is selected from the collection of Web Parts on the page.

In step 705, an inquiry is conducted to determine if there are any interfaces defined by Web Part W. Interfaces are a grouping of events relevant to a specific item, such as a row in a list. Interfaces form a communication bus between Web Parts. A Web Part raises an interface event to one or more connected Web Parts to request an action. Interfaces are typically paired as a provider to a consumer, so that events from the provider are handled in the consumer and vice versa. The connection designer object 215 determines if an interface group is defined by a Web Part. If no interfaces are defined by Web Part W, the "NO" branch is followed to step 706, where counter variable, W, is incremented by one. The process returns to step 702 for the selection of the next Web Part on the page. If interfaces are defined by Web Part W, the "YES" branch is followed to step 710, where the counter variable, X, is set equal to one.

In step 712, interface X is selected from Web Part W. The interface properties object 225 validates the interface properties for interface X in step 715. In step 716, the connection designer object 215 creates a group compatibility object 230 for interface groups in Web Part W. In step 720, counter variable, Y, is set equal to one. Variable, Y, represents the target Web Part in the Web Part collection. The target Web Part Y is selected from the current page in step 725. The connection designer object 215 creates a Web Part compatibility object 235 in step 726.

In step 730, an inquiry is conducted to determine if Web Part Y contains an interface. The connection designer object 215 determines if the Web Part contains an interface. If Web Part Y contains an interface, the "YES" branch is followed to step 736, where the counter variable, Z, is set equal to one. In step 740, interface Z for Web Part Y is selected. The interface properties object 225 validates the interface properties for interface Z in step 742.

In step 750, an inquiry is conducted to determine if interface X and interface Z are compatible. Compatibility of interfaces is determined by the Web Part compatibility object 235. Interfaces are compatible if the two interfaces have compatible ends. The concept of "compatible" ends can be understood by analogy to two magnets, wherein one is positively charged and the other is negatively charged. If the interfaces are not compatible, the "NO" branch is followed to step 756. Otherwise, the "YES" branch is followed to step 752, where the Web Part compatibility object 235 creates a group compatibility object 230 for interface groups in Web Part Y. The group compatibility object 230 is set if an interface group in Web Part W is connected to an interface group in Web Part Y in step 755.

In step 756, the group compatibility object 230 caches the compatibility code. In step 757, an inquiry is conducted to determine if Web Part Y contains another interface. The connection designer object 215 makes the determination as to whether Web Part Y contains another interface. If Web Part Y contains another interface, the "YES" branch is followed to step 745, where the variable Z is incremented by one. The process 320 returns to step 740 to select the next interface contained in Web Part Y. If Web Part Y does not contain another interface, the "NO" branch is followed to step 732.

Returning to step 730, if Web Part Y does not have an interface, the "NO" branch is followed to step 732. In step 732, an inquiry is conducted to determine if any other target Web Parts exist in the page. If so, the "YES" branch is followed to step 735, where the variable, Y, is incremented by one. The process 320 returns to step 725 for the selection of the next target Web Part. If no other target Web Parts exist on the page, the "NO" branch is followed to step 760.

In step 760, an inquiry is conducted to determine if Web Part W contains another interface. If so, the "YES" branch is followed to step 722, where the variable, X, is incremented by one. The process 320 returns to step 712 for the selection of the next interface from Web Part W. If Web Part W does not contain another interface, the "NO" branch is followed to step 766, where an inquiry is conducted to determine if any other source Web Parts exist on the page. If so, the "YES" branch is followed to step 706, where the variable, W, is incremented by one. The process 320 returns to step 702 for the selection of the next source Web Part. If no source Web Parts remain on the page, the "NO" branch is followed to step 321 of FIG. 322 of FIG. 3

Figure 8:
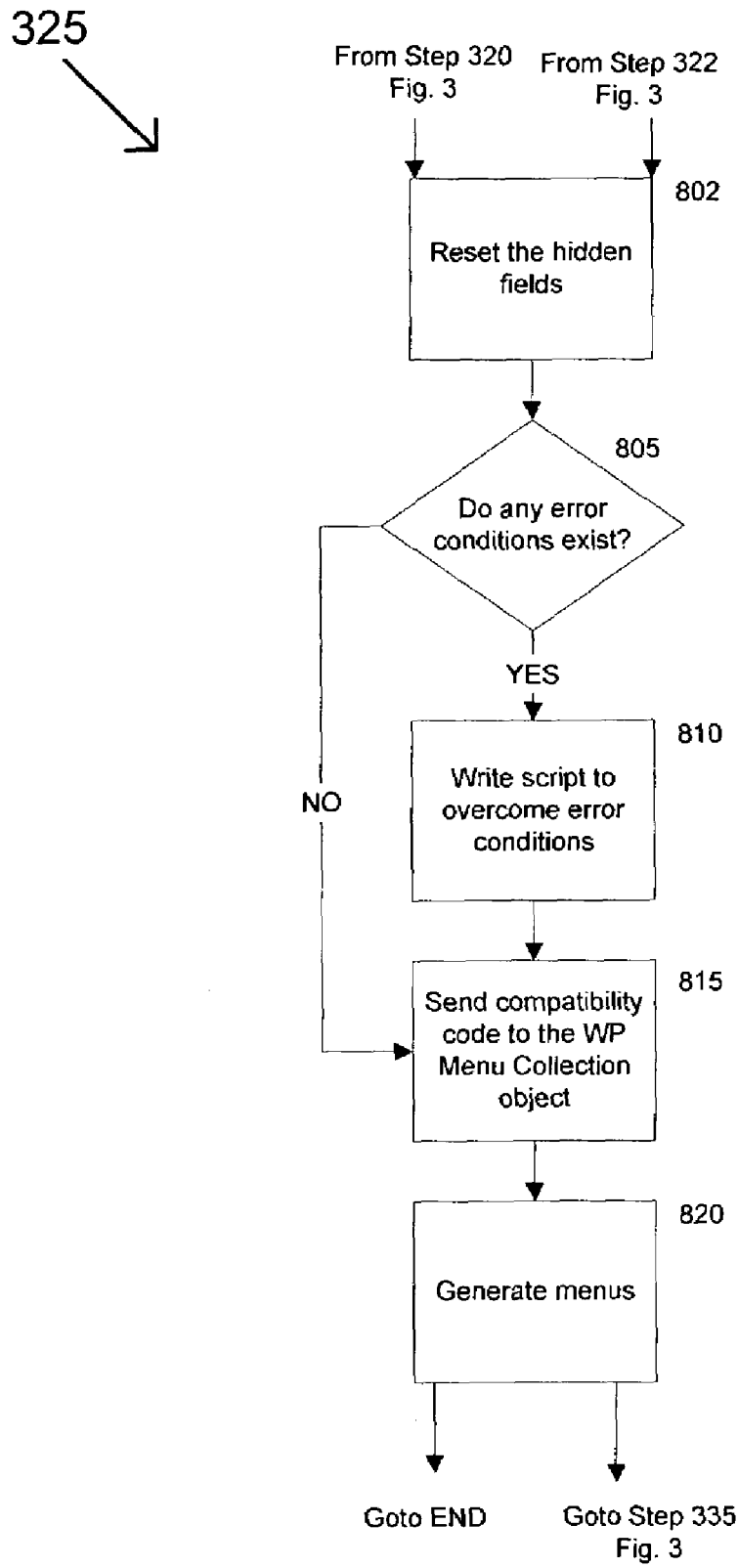
FIG. 8 is a flowchart illustrating a process for generating a connection menu user interface for selected source and target Web Parts in accordance with an exemplary embodiment of the present invention.

FIG. 8 is a logical flowchart diagram illustrating an exemplary computer-implemented method for generating a connection menu user interface and the selection of source and target parts by the user as completed by step 325 of FIG. 3. Now referring to FIGS. 1, 2, and 8, the exemplary method 325 begins with the WebPartPage object 250 resetting the hidden fields on the page in step 802. A hidden field is generated by the server 149 for each Web Part on the page. The hidden fields are set to "user selection" when a user attempts to create, modify, or delete a connection between Web Parts. Otherwise, the hidden fields are set to an empty string.

In step 805, an inquiry is conducted to determine if error conditions exist in the Web Part connections. If so, the "YES" branch is followed to step 810, where the connection designer object 215 writes script to overcome the error conditions. If no error conditions exist, the "NO" branch is followed to step 815, where the connection designer object 215 sends compatibility code to the WP menu collection object 245. The WP menu collection object 245 generates a series of menus for the Web Parts in step 820. The process 325 continues to step 335 of FIG. 3.

Figure 9:
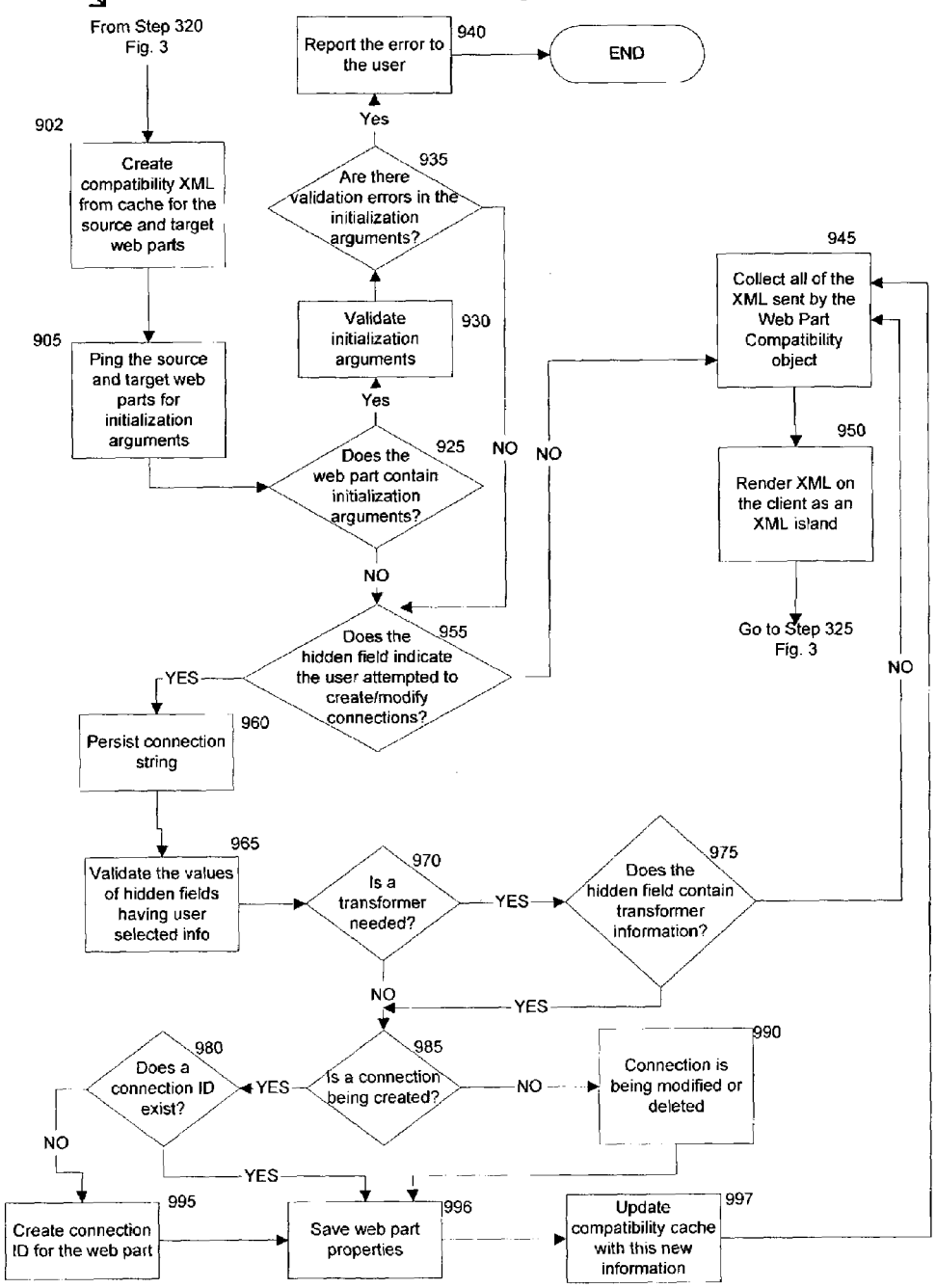
FIG. 9 is a flowchart illustrating a process for determining if a connection is created, modified or deleted in accordance with an exemplary embodiment of the present invention.

FIG. 9 is a logical flowchart diagram illustrating an exemplary computer implemented method for determining if a user has created, modified, or deleted a connection as completed by step 322 of FIG. 3. Referencing FIGS. 1, 2, and 9, the exemplary method 322 begins with the connection designer object 215 creating compatibility code from the cache for the source and target Web Parts in step 902. In one exemplary embodiment, the compatibility code is written in extensible markup language ("XML"). In step 905, the connection designer object 215 pings the source and target Web Parts for the initialization arguments contained within each of the Web Parts.

In step 925, an inquiry is conducted to determine if the Web Parts contain initialization arguments. If the Web Parts do not contain initialization arguments, the "NO" branch is followed to step 955, where an inquiry is conducted to determine if the hidden field indicates that the user has attempted to create or modify Web Part connections. The hidden field typically contains a value that indicates whether a user has attempted to create or modify a connection when the fields is set to user selections. If the hidden field does not indicate any attempt to create or modify a connection, the "NO" branch is followed to step 945. In step 945, the connection designer object 215 collects all of the XML sent by the Web Part compatibility object 235. In step 950, the connection designer object 215 renders the XML on the client as an XML island. The process 330 continues to step 325 of FIG. 3. If the hidden field does indicate an attempt to create or modify a connection, the "YES" branch is followed to step 960, where the connections object 210 persists the connection string. The connection string is persisted so that the connection string can be used in subsequent sessions of the WPC program 138.

In step 965, the connection designer object 215 validates the values of hidden fields having user selected information. In step 970, an inquiry is conducted to determine if a transformer is needed by the Web Parts. A transformer is useful when a user wants to connect one Web Part to another, but the two Web Parts do not have compatible interfaces. The transformer allows Web Parts with different interface types to be connected. The transformer defines how one item, such as a row, is converted to another, such as a cell. In one exemplary embodiment, the transformer is a client/server-side code that is instantiated by the connections object 210. If a transformer is not needed, the "NO" branch is followed to step 985. Otherwise, the "YES" branch is followed to step 975.

In step 975, an inquiry is conducted to determine if transformer information is contained in the hidden fields on the page. If not, the "NO" branch is followed to step 945. Otherwise, the "YES" branch is followed to step 985, where an inquiry is conducted to determine if a connection is being created. If no connection is created, the "NO" branch is followed to step 990, where the user modifies or deletes the connection. The process continues to step 996. If a connection is being created, the "YES" branch is followed to step 980.

In step 980, an inquiry is conducted to determine if a connection ID exists for the connection. The connection designer object 215 determines if the connection contains a connection ID. If no connection ID exists, the "NO" branch is followed to step 995, where the connection designer object 215 creates a connection ID for the Web Part. The process 330 continues to step 996. If the Web Part contains a connection ID, the "YES" branch is followed to step 996, where the connection designer object 215 saves the Web Part properties to the database 265. The Web Part properties include the connection ID. The compatibility cache is updated with the current information about the Web Part in step 997. The process 330 returns to step 945.

Returning to step 925, if the Web Part does contain initialization arguments, the "YES" branch is followed to step 930, where the connection designer object 215 validates the initialization arguments. In step 935, an inquiry is conducted to determine if any validation errors exist. The connection designer object 215 validates initialization arguments. If validation errors do exist, the "YES" branch is followed to step 940, where the WPC program 138 reports the error to the user at the workstation 201. The process then continues to the end step. If validation errors do not exist in step 935, the "NO" branch is followed to step 955.

Figure 10:
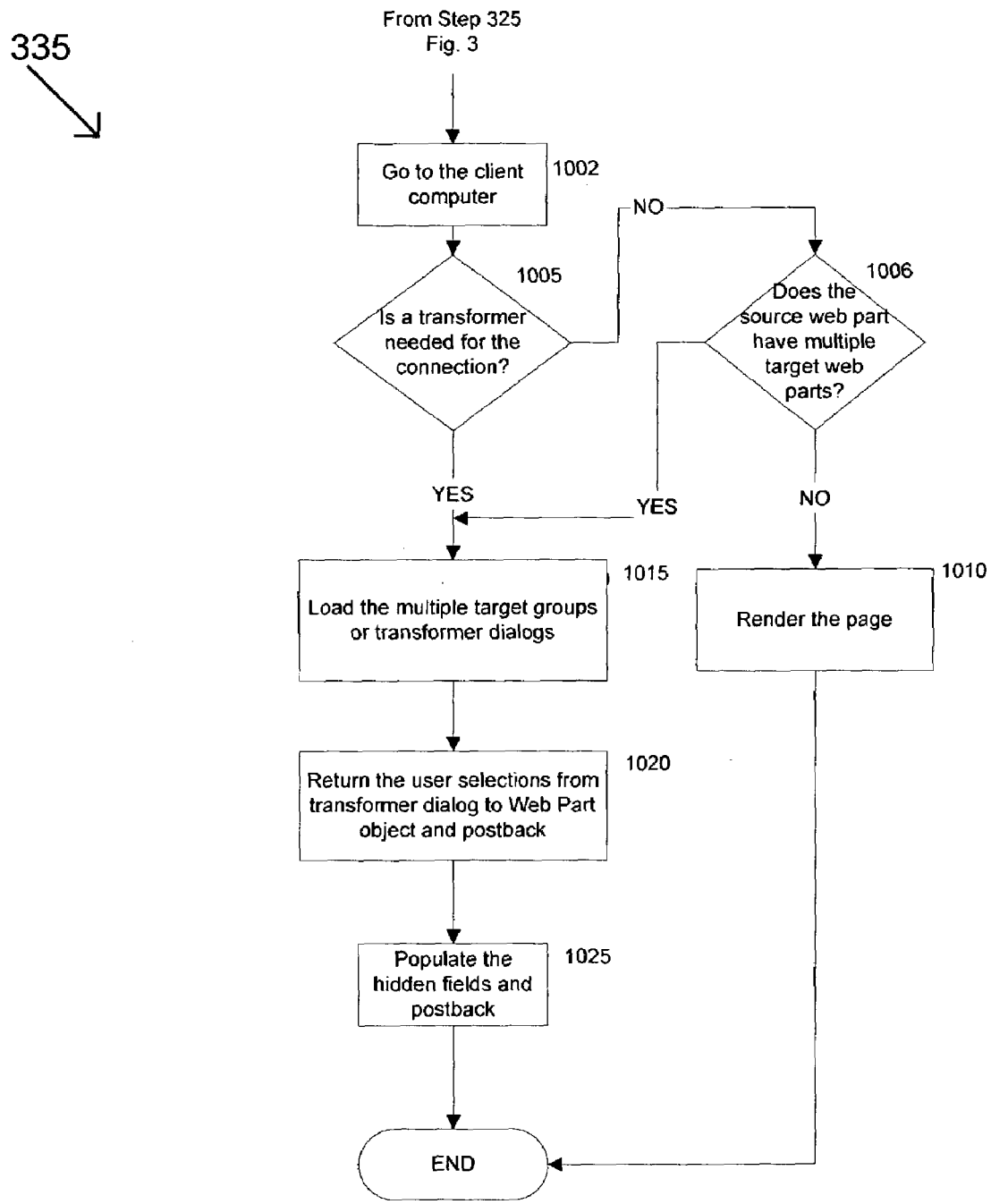
FIG. 10 is a flowchart illustrating a process for creating a transformer dialog user interface and persisting connection in accordance with an exemplary embodiment of the present invention.

FIG. 10 is a logical flowchart diagram illustrating an exemplary computer-implemented method for creating a transformer dialog user interface and a persisting connection for the WPC program 138 as completed by step 335 of FIG. 3. Referencing FIGS. 1, 2, and 10, the exemplary method 335 begins on the client-side in step 1002. In step 1005, an inquiry is conducted to determine if a transformer is needed by the Web Part or if the source Web Part has multiple target interface groups. The connection designer object 215 makes this determination. If no transformer is needed and the source Web Part does not have multiple target interface groups, the "NO" branch is followed to step 1010, where the page renders at the workstation 201. The process 335 continues to the END step. If a transformer is needed or the source Web Part has multiple target interface groups, the "YES" branch is followed to step 1015.

In step 1015, the connection designer object 215 loads the multiple target interface groups or transformer dialogs. In one exemplary embodiment, information is loaded by the connection designer object 215 sending XML code to dialog aspx pages as an input. A dialog page is a page with a dialog box that requests information from a user within the WPC program 138. The WebPartPage object 250 receives the user selections from the dialog box and posts back in step 1020. The WebPartPage object 250 populates the hidden fields and posts back in step 1025. The process 335 continues to the END step.

Figure 11:
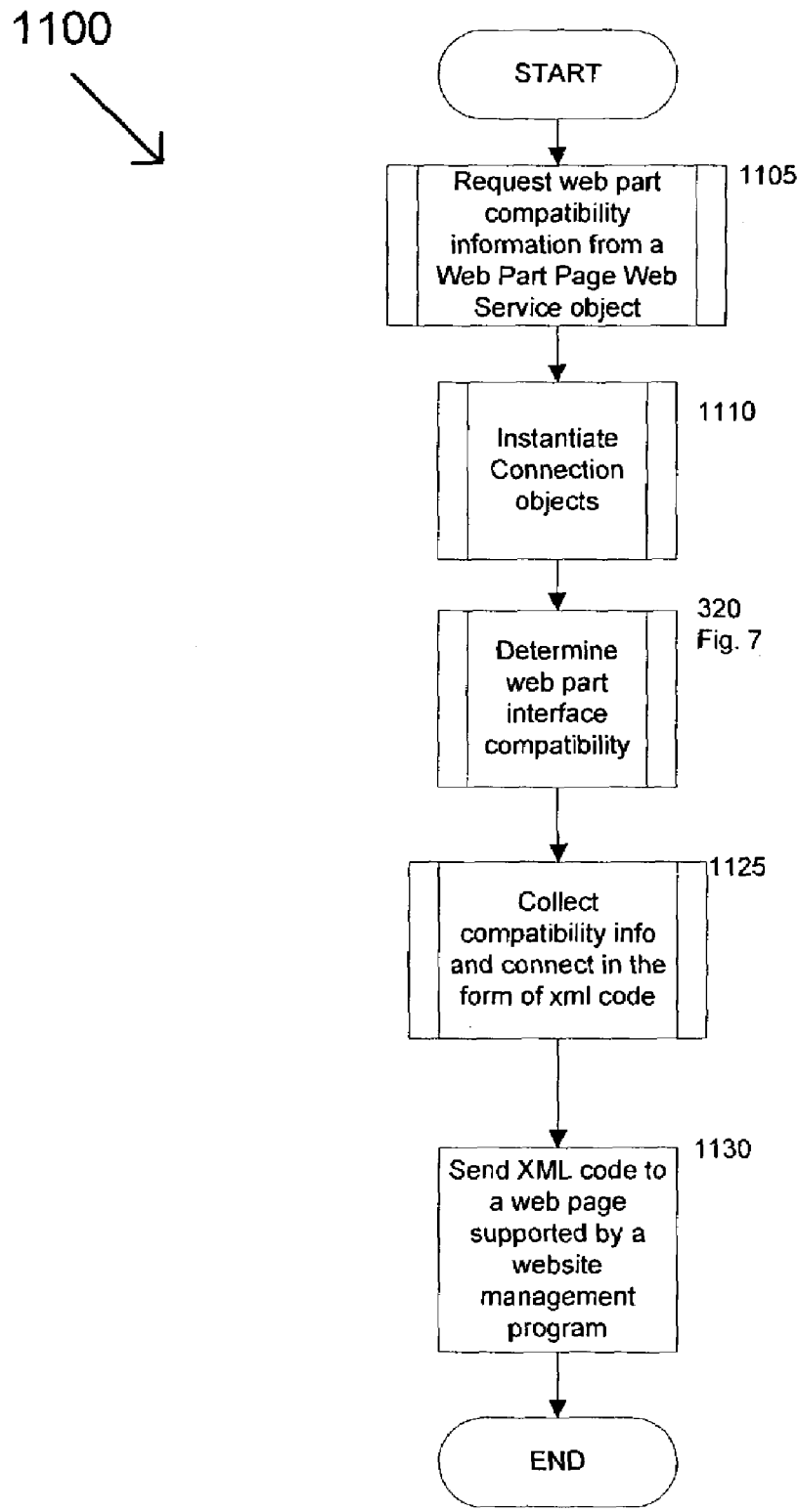
FIG. 11 is a flowchart illustrating a general overview for connecting Web Parts using a website management program in accordance with an exemplary embodiment of the present invention.

FIG. 11 is a logical flowchart diagram presented to illustrate the general steps of an exemplary process 1100 for using the WPC program 138 in conjunction with a website management program 270 to form connections between Web Parts located on one or more pages of the website management program 270 within the operating environment of the Web Parts connection system 200 of FIG. 2. The Web Parts connection program can determine the compatibility of Web Parts located on one or more pages supported by the website management program. The Web Part connection program can verify the compatibility of the Web Parts of the website management program by evaluating the interfaces supported by each Web Part. If the Web Parts are compatible, compatibility code can be generated by the Web Parts connection program and sent to the website management program. The compatibility code typically allows for a connection to be generated between a source Web Part and a target Web Part located on the website management program. The compatibility code can include the name of the target Web Part, the name of the source Web Part, the interface of the target Web Part, the interface of the source Web Part, the URL of the target Web Part, and the URL of the source Web Part. The Web Parts can use the compatibility code to build a connection and to pass information data between the Web Parts.

Now referring to FIGS. 1, 2, and 11, the exemplary method 1100 begins with a web page supported by a web site management program 270 requesting Web Part compatibility information for Web Parts on the web page, from the Web Part page web service 255 in step 1105. The Web Part compatibility information typically includes: the name of the target Web Part, the name of the source Web Part, the URL of the target Web Part, the URL of the source Web Part, the interface of the target Web Part, and the interface of the source Web Part. In step 1110, the connections are instantiated by the WPC program 138. The connection designer object 215 determines if the Web Part interfaces are compatible in step 320. Compatibility of Web Parts is necessary if data will be passed between the Web Parts. In step 1125, the connection designer object 215 collects all the compatibility information of the source Web Part and converts it into extensible markup language ("XML") code. The Web Part page web service 255 sends compatibility code to the web page supported by the web site management program in step 1130. In one exemplary embodiment, the compatibility code is written in XML. The process 1100 then continues to the END step.

Figure 12:
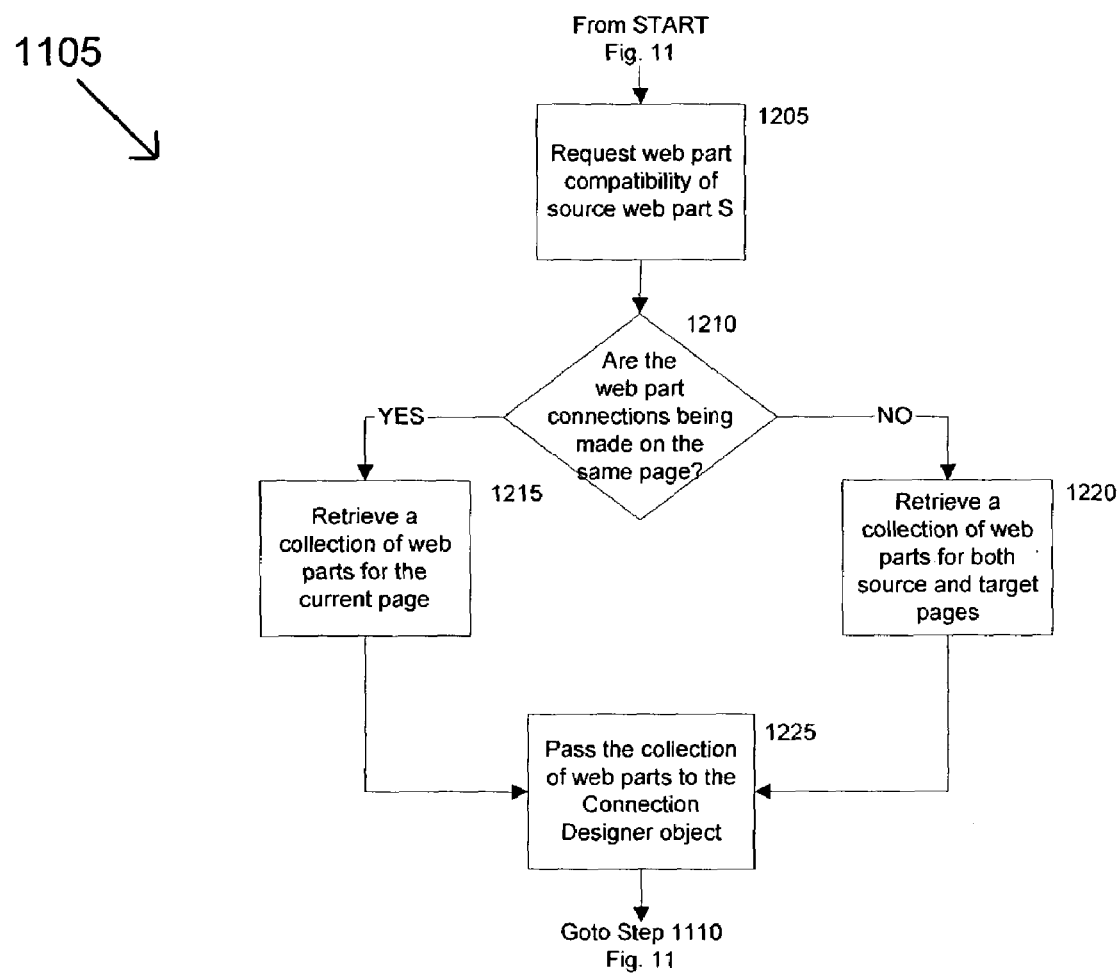
FIG. 12 is a flowchart illustrating a process for requesting Web Part compatibility code while using a website management program in accordance with an exemplary embodiment of the present invention.

FIG. 12 is a logical flowchart diagram illustrating an exemplary computer-implemented method for a web site management program requesting compatibility code about Web Parts from the Web Part page web service as completed by step 1105 of FIG. 11. Referencing FIGS. 1, 2, and 12, the exemplary method 1105 begins with the web site management program 270 requesting compatibility code concerning source Web Part S from the Web Part page web service 255 in step 1205.

In step 1210, an inquiry is conducted to determine if the Web Parts are connecting on the same page. If so, the "YES" branch is followed to step 1215, where the design time parser 260 retrieves a collection of Web Parts for the current page. If the Web Parts are not connecting on the same page, the "NO" branch is followed to step 1220, where the design time parser 260 retrieves a collection of Web Parts from the source and the target pages. The source page contains source Web Parts that can provide data to target Web Parts located on a target page. In step 1225, the Web Part page web service 255 sends the collection of Web Parts to the connection designer object 215. The process 1105 continues to step 1110 of FIG. 11.

Figure 13:
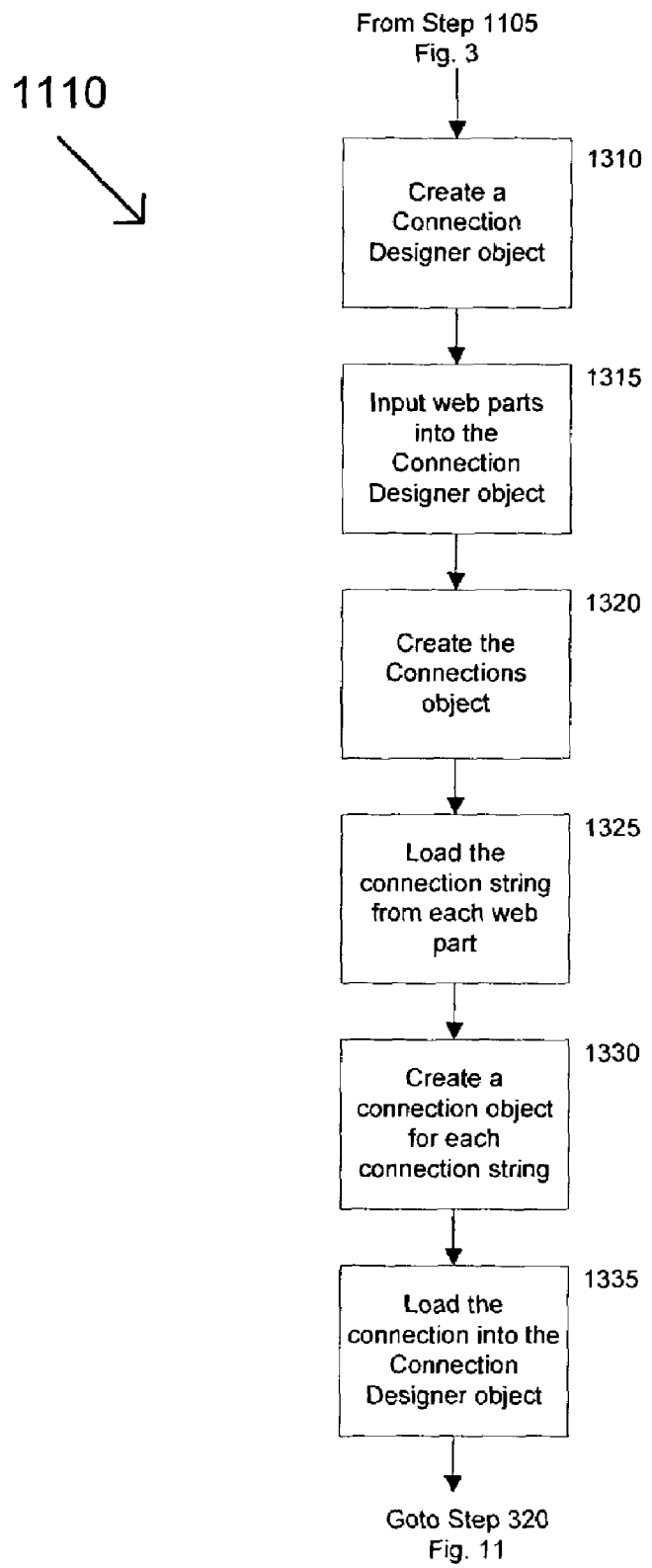
FIG. 13 is a flowchart illustrating a process for instantiating a connection object while using a website management program in accordance with an exemplary embodiment of the present invention.

FIG. 13 is a logical flowchart diagram illustrating an exemplary computer-implemented method for instantiating connection objects 210 between Web Parts in a WPC program 138 as completed by step 1110 of FIG. 11. Referencing FIGS. 1, 2, and 13, the exemplary method 1110 begins with the WebPartPage object 250 creating the connection designer object 215 in step 1310. In step 1315, the WebPartPage object 250 inputs Web Parts into the connection designer object 215.

In step 1320, the WPC program 138 creates a connections object 210. In step 1325, the connections object 210 loads a connection string for each Web Part. The connection string comprises parameters that define the connection between the Web Parts. The connections object 210 creates a connection for each connection string by reading in the connection string for each Web Part in step 1330. In step 1335, the connections object 210 loads the connection into the connection designer object 215. The process 1110 continues to step 320 of FIG. 11.

Figure 14:
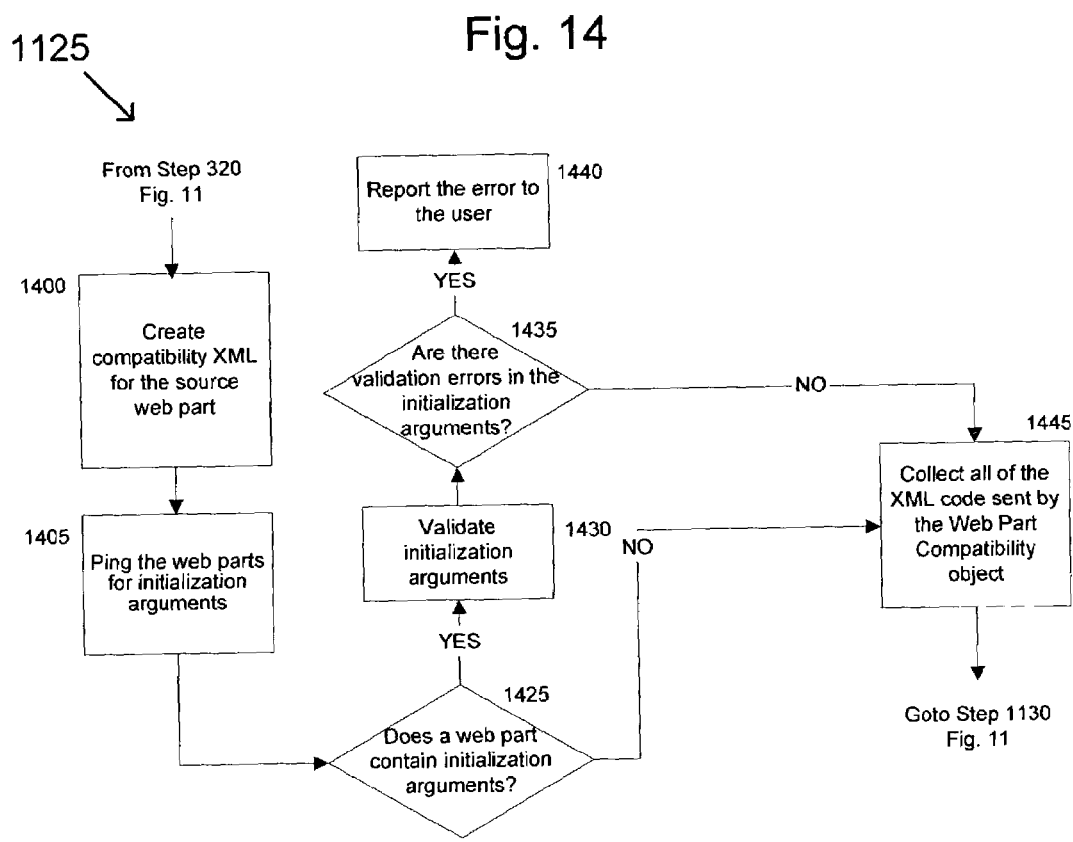
FIG. 14 is a flowchart illustrating a process for determining if a connection is created, modified or deleted while using a website management program in accordance with an exemplary embodiment of the present invention.

FIG. 14 is a logical flowchart diagram illustrating an exemplary computer-implemented method for validating initialization arguments in Web Parts while using a web site management program as completed by step 1125 of FIG. 11. Referencing FIGS. 1, 2, and 14, the exemplary method 1125 begins with the connection designer object 215 creating compatibility code for the source Web Parts in step 1400. In step 1405, the connection designer object 215 pings all of the Web Parts in the Web Parts collection for the initialization arguments contained within each of the Web Parts.

In step 1425, an inquiry is conducted to determine if the Web Parts contain initialization arguments. If the Web Parts do not contain initialization arguments, the "NO" branch is followed to step 1445. If the Web Parts do contain initialization arguments, the "YES" branch is followed to step 1430, where the connection designer object 215 validates the initialization arguments. In step 1435, an inquiry is conducted to determine if any validation errors exist with the initialization arguments. If validation errors exist, the "YES" branch is followed to step 1440, where the WPC program 138 reports the error to the user. Otherwise, the "NO" branch is followed to step 1445. In step 1445, the connections designer object 215 collects all of the XML sent by the Web Part compatibility object 235. The process 1125 continues to step 1130 of FIG. 11

In view of the foregoing, the present invention supports a computer-implemented method and architecture for connecting Web Parts on a page. A user can select a source Web Part and a target Web Part from a page in a browser or application. The selected Web Parts are connected to support communications between the Web Parts. An exemplary method examines the Web Parts and determines if they are compatible. If the Web Parts are compatible, a user interface provides the user with the ability to select that data from the source Web Part which is to be passed or shared with the target Web Part.

It will be appreciated that the present invention fulfills the needs of the prior art described herein and meets the above-stated objectives. While there have been shown and described several exemplary embodiments of the present invention, it will be evident to those skilled the art that various modifications and changes may be made thereto without departing from the spirit and the scope of the present invention as set forth in the appended claims and equivalence thereof.

We claim:

1. A computer-implemented method for connecting Web Parts comprising the steps of:
    selecting a first Web Part and a second Web Part to support a connection between the first Web Part and the second Web Part;
    creating the connection to connect the first Web Part and the second Web Part;
    determining if the first Web Part is compatible with the second Web Part;
    if the Web Parts are compatible, then enabling a communication of data via the connection between the first Web Part and the second Web Part; and
    presenting a connection menu user interface in response to a determination that the first Web Part is compatible with the second Web Part, wherein the connection menu user interface allows for the selection of the data for communication from the first Web Part to the second Web Part.

2. The computer-implemented method of claim 1, wherein the step of generating a connection menu user interface comprises:
    determining if the connection between the first Web Part and the second Web Part comprises an error condition;
    generating a script to resolve the error condition;
    receiving compatibility code for each of the first Web Part and the second Web Part; and
    generating the connection menu user interface based on the received compatibility code.

3. The computer-implemented method of claim 1, wherein the step of creating the connection to connect the Web Parts comprises:
    determining if a first hidden field for the first Web Part on a web page contains a predetermined value;
    receiving a first connection string for the first Web Part in response to a determination that the first hidden field for the first Web Part contains the predetermined value, wherein the first connection string comprises an event;
    determining if a second hidden field for the second Web Part on the web page contains the predetermined value;
    receiving a second connection string for the second Web Part in response to a determination that the second hidden field for the second Web Part contains the predetermined value, wherein the second connection string comprises an event handler; and
    connecting the event of the first Web Part to the event handler of the second Web Part to create the connection between the first and second Web Parts.

4. The computer-implemented method of claim 1, wherein the step of determining if the first Web Part is compatible with the second Web Part comprises:
    retrieving a first interface in response to selection of the first Web Part, the first interface comprising a designation of the type of data contained in the first Web Part;
    validating a first interface property of the first interface;
    retrieving a second interface in response to selection of the second Web Part, the second interface comprising a designation of the type of data contained in the second Web Part;
    validating a second interface property of the second interface;
    determining if the first interface property is compatible with the second interface property;

determining if the first interface is connected to the second interface in response to a determination that the first interface property is compatible with the second interface property;

generating a compatibility code for the first Web Part and the second Web Part in response to a determination that the first interface is connected to the second interface; and storing the compatibility code for the first Web Part and the second Web Part.

5. The computer-implemented method of claim 4 further comprising the step of selecting a transformer for operation with the first interface and the second interface in response to a determination that the first and second interface are not compatible, the transformer operative to establish compatibility among the first and second interfaces.

6. The computer-implemented method of claim 1 further comprising the step of presenting a transformer dialog in response to a determination that the first Web Part and the second Web Part are not compatible, wherein the transformer dialog provides a user interface for soliciting information about one or more modifications to the first Web Part or second Web Part to achieve compatibility of the Web Parts.

7. The computer implemented method of claim 1, wherein the step of selecting a first Web Part and a second Web Part comprises:

selecting the first Web Part from a page; and selecting the second Web Part from a connection menu comprising a user interface identifying a plurality of Web Parts on the page.

8. The computer-implemented method of claim 1, further comprising the steps of:

receiving a first initialization argument from the first Web Part;

receiving a second initialization argument from the second Web Part;

determining if the first initialization argument and the second initialization argument contain errors;

receiving a Web Part compatibility code in response to a determination that the first and second initialization arguments do not contain errors; and rendering a Web Part compatibility code for the first Web Part and the second Web Part.

9. The computer-implemented method of claim 1, comprising the steps of:

in response to creating the connection for the first Web Part and the second Web Part, generating a connection identifier for the second Web Part based on a positive determination that the connection has been created; and storing the connection identifier in the second Web Part.

10. A computer readable medium having computer-executable instructions for performing the steps recited in claim 1.

11. A computer-implemented method for connecting Web Parts located on a web page supported by a website management program comprising the steps of:

accepting Web Part compatibility information for a first Web Part and a second Web Part, the first Web Part and the second Web Part maintained on the web page;

evaluating the Web Part compatibility information to determine if the first Web Part comprises an event that is compatible to an event handler in the second Web Part;

connecting the first Web Part to the second Web Part with a connection in response to a positive determination that the first Web Part comprises an event compatible to an event handler in the second Web Part;

determining if the first Web Part is compatible with the second Web Part by determining if an interface in the first Web Part is compatible with an interface in the second Web Part; and sending a compatibility code to the website management program, the compatibility code comprising an identification of the compatibility of the first Web Part and the second Web Part, whereby the compatibility code allows the first and second Web Parts on the web page to pass data via the connection.

12. The computer-implemented method of claim 11, further comprising the steps of:

receiving a first initialization argument for the first Web Part;

receiving a second initialization argument for the second Web Part;

determining if the first initialization argument and the second initialization argument contain errors; and sending the compatibility code to the website management program in response to a determination that the first and second initialization arguments do not contain errors.

13. The computer-implemented method of claim 11 further comprising the step of generating the compatibility code for the first Web Part and the second Web Part in response to the determination of the compatibility of the first Web Part and the second Web Part.

14. The computer-implemented method of claim 11, wherein the step of accepting Web Part compatibility information for a first Web Part and a second Web Part comprises:

responsive to the Web Part compatibility information for the first Web Part and the second Web Part, determining whether the first Web Part and the second Web Part are connected on an identical page supported by the website management program by evaluating the Web Part compatibility information;

retrieving the first Web Part and the second Web Part on the identical page in response to a determination that the first Web Part and the second Web Part are connected on the identical page supported by the website management program; and retrieving the first Web Part from a source page supported by the website management program and the second Web Part from a target page supported by the website management program in response to a negative determination that the first Web Part and the second Web Part connect on the identical page.

15. The computer-implemented method of claim 11, wherein the step of connecting the first Web Part to the second web comprises:

accepting the first Web Part and the second Web Part from a web page supported by the website management program;

generating a first connection string for the first Web Part, wherein the first connection string comprises an event;

generating a second connection string for the second Web Part, wherein the second connection string comprises an event handler; and connecting the event of the first Web Part to the event handler of the second Web Part to create a connection between the first and second Web Parts.

16. The computer-implemented method of claim 11, wherein the step of determining if the first Web Part is compatible with the second Web Part comprises:

retrieving a first interface from a first Web Part, the first interface comprising a designation of the type of data contained in the first Web Part;

validating the first interface property of the first interface;

retrieving a second interface from the second Web Part, the second interface comprising a designation of the type of data contained in the second Web Part;

validating the second interface property of the second interface;

determining if the first interface property is compatible with the second interface property;

determining if the first interface is connected to the second interface in response to a determination that the first interface property is compatible with the second interface property;

generating a compatibility code for the first Web Part and the second Web Part in response to a determination that the first interface is connected to the second interface; and storing compatibility code for the first Web Part and the second Web Part.

17. The computer-implemented method of claim 16 further comprising the step of selecting a transformer for operation with the first interface and the second interface in response to a determination that the first and second interface are not compatible, the transformer operative to establish compatibility among the first and second interfaces.

18. A computer readable medium having computer-executable instructions for performing the steps recited in claim 11.

19. A computer-implemented method for connecting Web Parts with a website management program comprising:

generating Web Part compatibility information for a first Web Part and a second Web Part;

responsive to the Web Part compatibility information, retrieving the first Web Part and the second Web Part from a web page supported by the website management program;

connecting the first Web Part to the second Web Part with a connection;

retrieving a first interface from the first Web Part and a second interface from the second Web Part in response to the connection of the first and second Web Parts;

determining if the first interface is compatible with the second interface;

generating a compatibility code in response to a positive determination that the first interface is compatible with the second interface; and sending the Web Part compatibility code to the web page supported by the website management program, whereby the compatibility code allows the first and second Web Parts to pass data in the connection.

20. The computer-implemented method of claim 19, wherein the first interface and the second interface are of the same type.

21. The computer-implemented method of claim 19, wherein the step of connecting the first Web Part to the second Web Part comprises:

generating a first connection string for the first Web Part, wherein the first connection string comprises an event;

generating a second connection string for the second Web Part, wherein the second connection string comprises an event handler; and connecting the event of the first Web Part to the event handler of the second Web Part to create the connection between the first and second Web Parts.

22. The computer-implemented method of claim 19 further comprising the steps of:

receiving a first initialization argument for the first Web Part;

receiving a second initialization argument for the second Web Part;

determining if the first initialization argument and the second initialization argument contain errors;

receiving the compatibility code in response to a determination that the first and second initialization arguments do not contain errors; and sending the compatibility code to the web page supported by the website management program.

* * * * *